United States Patent
Takizawa (10) Patent No.: US 11,059,138 B2
(45) Date of Patent: Jul. 13, 2021

(54) MACHINE TOOL, MACHINING SYSTEM, AND ADDITIONAL TABLE UNIT

(71) Applicant: Fanuc Corporation, Yamanashi (JP)

(72) Inventor: Ryouta Takizawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/805,914

(22) Filed: Mar. 2, 2020

(65) Prior Publication Data

US 2020/0316738 A1    Oct. 8, 2020

(30) Foreign Application Priority Data

Apr. 4, 2019    (JP) .............................. JP2019-072032

(51) Int. Cl.
    *B23Q 5/26*    (2006.01)
(52) U.S. Cl.
    CPC ........ *B23Q 5/266* (2013.01); *B23Q 2220/004* (2013.01)
(58) Field of Classification Search
    CPC .......................... B23Q 5/266; B23Q 2220/004
    See application file for complete search history.

(56) References Cited

U.S. PATENT DOCUMENTS

| | | |
|---|---|---|
| 2011/0023655 A1 | 2/2011 | Tatsuda |
| 2016/0008939 A1* | 1/2016 | Masuya ............. B23Q 11/0092 29/64 |
| 2018/0073563 A1* | 3/2018 | Nakanishi ........... F16C 33/6674 |

FOREIGN PATENT DOCUMENTS

| | | |
|---|---|---|
| EP | 2281658 A1 | 2/2011 |
| JP | 2003-211335 A | 7/2003 |
| JP | 2009-248244 A | 10/2009 |
| JP | 2015-155144 A | 8/2015 |
| JP | 2015-225617 A | 12/2015 |

* cited by examiner

*Primary Examiner* — Vicky A Johnson
(74) *Attorney, Agent, or Firm* — Shackelford, Bowen, McKinley & Norton, LLP (57) ABSTRACT

A machine tool including a rotary table to which a workpiece to be subjected to machining is attached, a motor that rotates the rotary table, a brake that places the rotary table in a clamping state or an unclamping state, a valve that controls fluid supplied from a fluid supply source to the brake for placing the brake in the clamping state or the unclamping state, and a controller that controls the motor and the valve, where the controller determines whether or not rotation of the rotary table by the motor should be executed on the basis of a signal from a pressure switch of a regulator provided between the fluid supply source and the valve.

4 Claims, 7 Drawing Sheets

FIG. 8

MACHINE TOOL, MACHINING SYSTEM, AND ADDITIONAL TABLE UNIT

CROSS-REFERENCE TO RELATED APPLICATIONS

This application is based on and claims priority to Japanese Patent Application No. 2019-072032 filed on Apr. 4, 2019, the entire content of which is incorporated herein by reference.

TECHNICAL FIELD

The present invention relates to a machine tool, a machining system, and an additional table unit.

BACKGROUND ART

Conventionally, machine tools are known in which a workpiece is attached to a rotary table and machining is performed on the workpiece while the position of rotation of the rotary table is changed by a servo motor. For example, such a technique is described in PTL 1. Such a machine tool has a brake that is actuated by supply air so as to hold the rotary table at a predetermined indexed position (stop position).

CITATION LIST

Patent Literature

{PTL 1}
Japanese Unexamined Patent Application, Publication No. 2015-155144

SUMMARY OF INVENTION

A machine tool of a first aspect of the present disclosure includes a rotary table to which a workpiece to be subjected to machining is attached; a motor that rotates the rotary table; a brake that places the rotary table in a clamping state or an unclamping state; a valve that controls fluid supplied from a fluid supply source to the brake for placing the brake in the clamping state or the unclamping state; and a controller that controls the motor and the valve, wherein the controller determines whether or not rotation of the rotary table by the motor should be executed on the basis of a signal from a pressure switch of a regulator provided between the fluid supply source and the valve.

A machining system of a second aspect of the present disclosure includes a plurality of the aforementioned machine tools and a management computer that controls the machine tools, where the management computer requests, on the basis of information of a machining status received from the machine tools, some of the machine tools to change the machining process timing when it is determined that a period exists in which a used amount of the fluid exceeds a predetermined criterion.

A third aspect of the present disclosure is directed to mounted to an X-Y table of a machine tool, the additional table unit including: a rotary table to which a workpiece to be subjected to machining is attached; a motor that rotates the rotary table; a brake that places the rotary table in a clamping state or an unclamping state; a valve that controls fluid supplied from a fluid supply source to the brake for placing the brake in the clamping state or the unclamping state; and a controller that controls the motor and the valve, wherein the controller determines whether or not rotation of the rotary table by the motor should be executed on the basis of a signal from a pressure switch of a regulator provided between the fluid supply source and the valve.

DESCRIPTION OF EMBODIMENTS

A machine tool 1 in accordance with one embodiment will be described hereinbelow with reference to the drawings.

Figure 1:
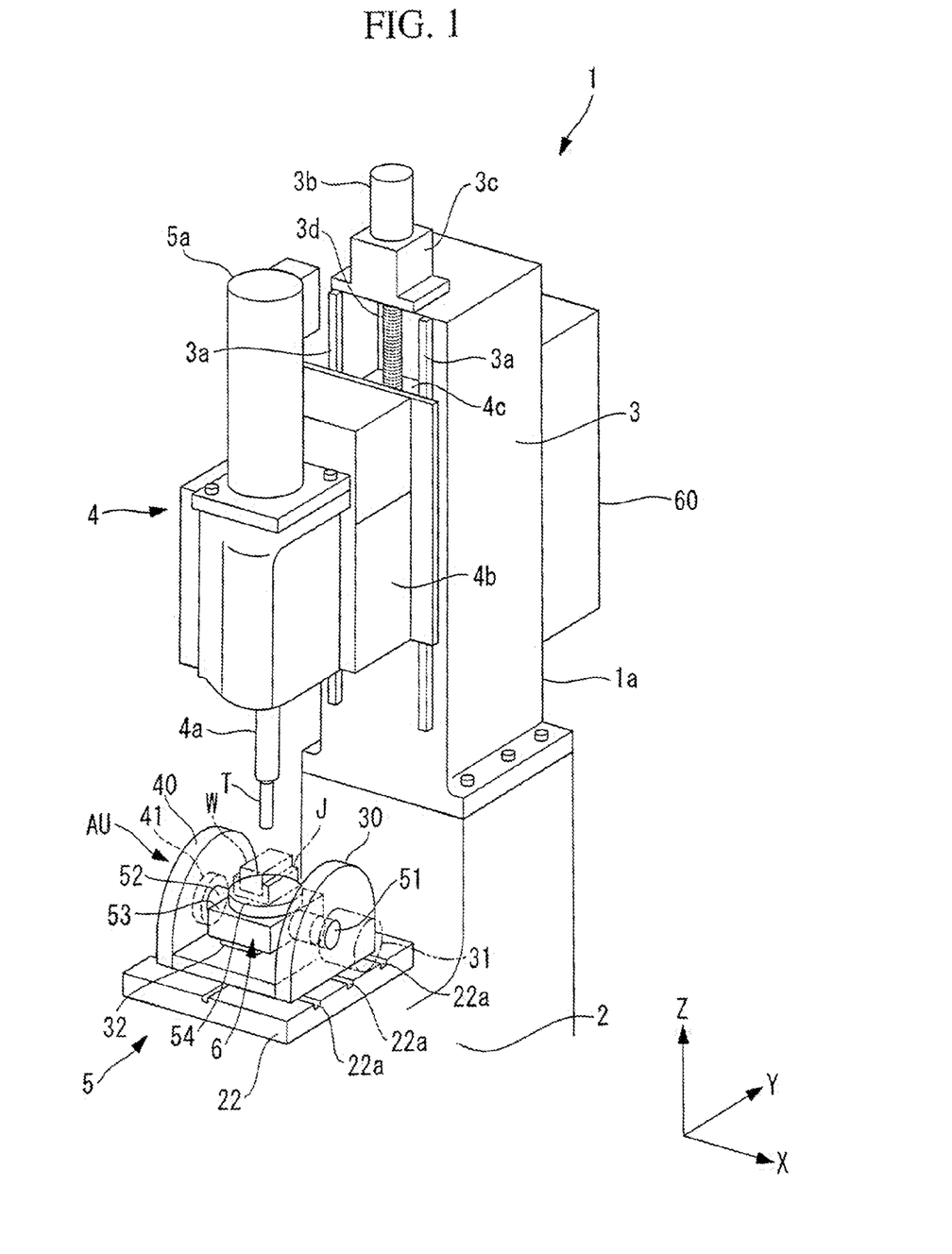
FIG. 1 is a schematic perspective view of a machine tool in accordance with one embodiment of this invention.

The machine tool 1 in accordance with this embodiment includes, as illustrated in FIG. 1, a machine tool main body 1a which has a base 2 and a column section 3 extending upward from the base 2, a spindle unit 4 supported by the column section 3 such that the spindle unit 4 is movable in an up-and-down direction, and a table unit (movement mechanism) 5 that supports a workpiece W. A not-shown tool magazine adapted for automatic exchange of tools T to be mounted to a spindle 4a of the spindle unit 4 may be provided on the spindle unit 4.

Figure 2:
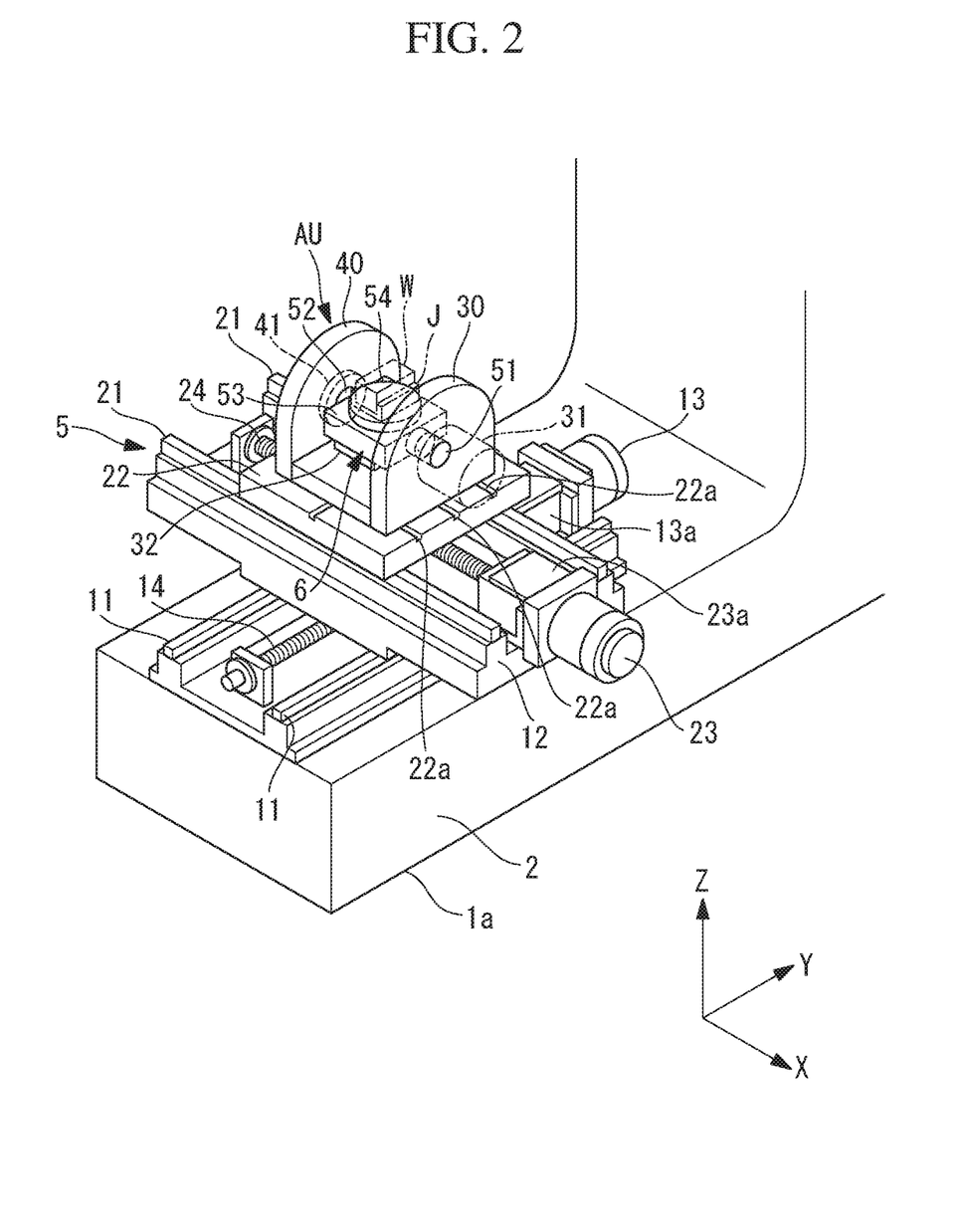
FIG. 2 is a schematic perspective view of a table unit of the machine tool of this embodiment.

The base 2 is installed at a location where the machine tool 1 is used using, for example, a leveling bolt, an anchor bolt, or the like. As illustrated in FIG. 2, the table unit 5 is arranged on the base 2, and the workpiece W is fixed to the first rotary table 6 of the table unit 5 by any appropriate fixing means. The first rotary table 6 and the workpiece W are adapted to move relative to the spindle 4a in an X-axis direction, in a Y-axis direction, about the X-axis, and about an axis extending in the up-and-down direction by means of a plurality of servo motors 13, 23, 31, and 32, which will be described later, provided on the table unit 5. The spindle 4a and a spindle head 4b of the spindle unit 4 are arranged above the table unit 5.

The tool T is a portion adapted to be brought into contact with the workpiece W for machining the workpiece W and, for example, it is a tool of any appropriate type such as drills, tap, milling cutters, polishing tools, etc.

The spindle head 4b rotatably supports the spindle 4a, and a spindle motor 5a adapted to rotate the spindle 4a is fixed to an upper end of the spindle head 4b. Also, the spindle head 4b is supported by the column section 3 of the machine tool main body 1a such that the spindle head 4b is movable in the up-and-down direction.

Specifically, a plurality of guide rails 3a extending in a vertical direction (Z-axis direction) are provided on the column section 3, and the spindle head 4b is supported by the guide rails 3a so as to be movable in the vertical direction. Also, a Z-axis motor 3b is fixed to the upper end of the column section 3, and the output from an output shaft of the Z-axis motor 3b is transmitted via a decelerator 3c and the like to a ball screw 3d. The ball screw 3d is arranged along the guide rails 3a, and the ball screw 3d is placed in threaded engagement with a ball screw nut fixed to the back surface section 4c of the spindle head 4b. By virtue of this feature, the spindle unit 4 moves in the vertical direction by means of the rotation of the output shaft of the Z-axis motor 3b.

As illustrated in FIG. 2, a plurality of guide rails 11 extending in the Y-axis direction, which is a horizontal direction, are provided on an upper surface section of the base 2, and a Y-direction movable section 12 is supported by the guide rails 11 so as to be movable in the Y-axis direction. Also, a Y-axis motor 13 is fixed to the upper end of the base 2, and the output from an output shaft of the Y-axis motor 13 is transmitted via a decelerator 13a and the like to a ball screw 14. The ball screw 14 is arranged along the guide rails 11 and the ball screw 14 is placed in threaded engagement with a ball screw nut which is part of the Y-direction movable section 12. By virtue of this feature, the Y-direction movable section 12 moves in the Y-axis direction by means of the rotation of the output shaft of the Y-axis motor 13.

Also, as illustrated in FIG. 2, a plurality of guide rails 21 extending in the X-axis direction, which is a horizontal direction, are provided at the upper surface section of the Y-direction movable section 12, and an X-Y table 22 is supported by the guide rails 21 so as to be movable in the X-axis direction. Also, an X-axis motor 23 is fixed to the upper surface section of the Y-direction movable section 12, and the output from an output shaft of the X-axis motor 23 is transmitted via a decelerator 23a and the like to a ball screw 24. The ball screw 24 is arranged along the guide rails 21, and the ball screw 24 is placed in threaded engagement with a ball screw nut which is part of the X-Y table 22. By virtue of this feature, the X-Y table 22 moves in the X-axis direction by means of the rotation of the output shaft of the X-axis motor 23.

By virtue of the above-described feature, the X-Y table 22 moves relative to the spindle 4a in the X-axis direction and the Y-axis direction.

The X-Y table 22 is, typically, a table for attaching thereto the workpiece W or a jig used to fix the workpiece W. A plurality of grooves 22a are provided on the upper surface of the X-Y table 22 and the grooves 22a are used to fix the workpiece W or the jig for fixation of the workpiece W. For example, the groove 22a has an upper end whose width is reduced than the lower portion of the groove 22a. A bolt that has been inserted into the workpiece W or the jig to extend therethrough is tightened into a receiving piece disposed in the groove 22a, as a result of which the workpiece W or the jig for fixation of the workpiece W is fixed to the X-Y table 22.

In a case where the workpiece W or the jig for fixation of the workpiece is fixed to the X-Y table 22, the machine tool 1 moves the tool T in the up-and-down direction by the Z-axis motor 3b while moving the workpiece W in the X-axis direction and the Y-axis direction by the X-axis motor 23 and the Y-axis motor 13. As a result of this, predetermined machining is performed on the workpiece W.

In this embodiment, an additional table unit AU is fixed to the X-Y table 22. The additional table unit AU is configured to rotate the workpiece about the X-axis and about an axis extending in the up-and-down direction, in addition to the movement in the X-axis direction and the Y-axis direction.

The additional table unit AU has a first support section 30 fixed to the X-Y table 22 and a second support section 40 fixed to the X-Y table 22. As illustrated in FIGS. 1 and 2, the first support section 30 and the second support section 40 may be connected to each other by a plate-like connection member. When the aforementioned fixation is done, the first support section 30 and the second support section 40 are aligned in the X-axis direction. For example, bolts that have been inserted into a part of the first support section 30 and the second support section 40 to extend therethrough is tightened into receiving pieces disposed in the groove 22a, as a result of which the first support section 30 and the second support section 40 are fixed to the X-Y table 22. Note that, in a case where the first support section 30 and the second support section 40 are aligned in the Y-axis direction when the aforementioned fixation is done, the additional table unit AU will rotate the workpiece W about the Y-axis and about the axis extending in the up-and-down direction.

The additional table unit AU has a first rotary table 6 supported by the first support section 30 and the second support section 40. The first rotary table 6 has a shaft 51 supported by the first support section 30 so as to be rotatable about the X-axis, a shaft 52 supported by the second support section 40 so as to be rotatable about the X-axis, and a plate member 53 both ends of which are fixed to the shafts 51, 52, respectively. The first additional shaft motor 31 is fixed to the first support section 30, and the output shaft of the first additional shaft motor 31 is directly fixed to the shaft 51. In other words, the rotational force of the first additional shaft motor 31 is transmitted to the shaft 51 without intervention of a gear of a decelerator or the like. Such a mechanism is sometimes called direct drive.

A second rotary table 54 is provided on the plate member 53, and the second rotary table 54 is supported by the plate member 53 so as to be rotatable about an axis extending in a direction orthogonal to the X-axis. A second additional shaft motor 32 is fixed to the plate member 53, and an output shaft of the second additional shaft motor 32 is directly fixed to the second rotary table 54. In other words, the rotational force of the second additional shaft motor 32 is transmitted to the second rotary table 54 without intervention of a gear of a decelerator and the like. The structure is also a direct drive mechanism.

Inside the second support section 40, a brake 41 for stopping the rotation of the first rotary table 6 is provided. In this embodiment, the brake 41 is configured to stop the rotation of the shaft 52 by frictional force, but may also be a brake of any other types.

Figure 3:
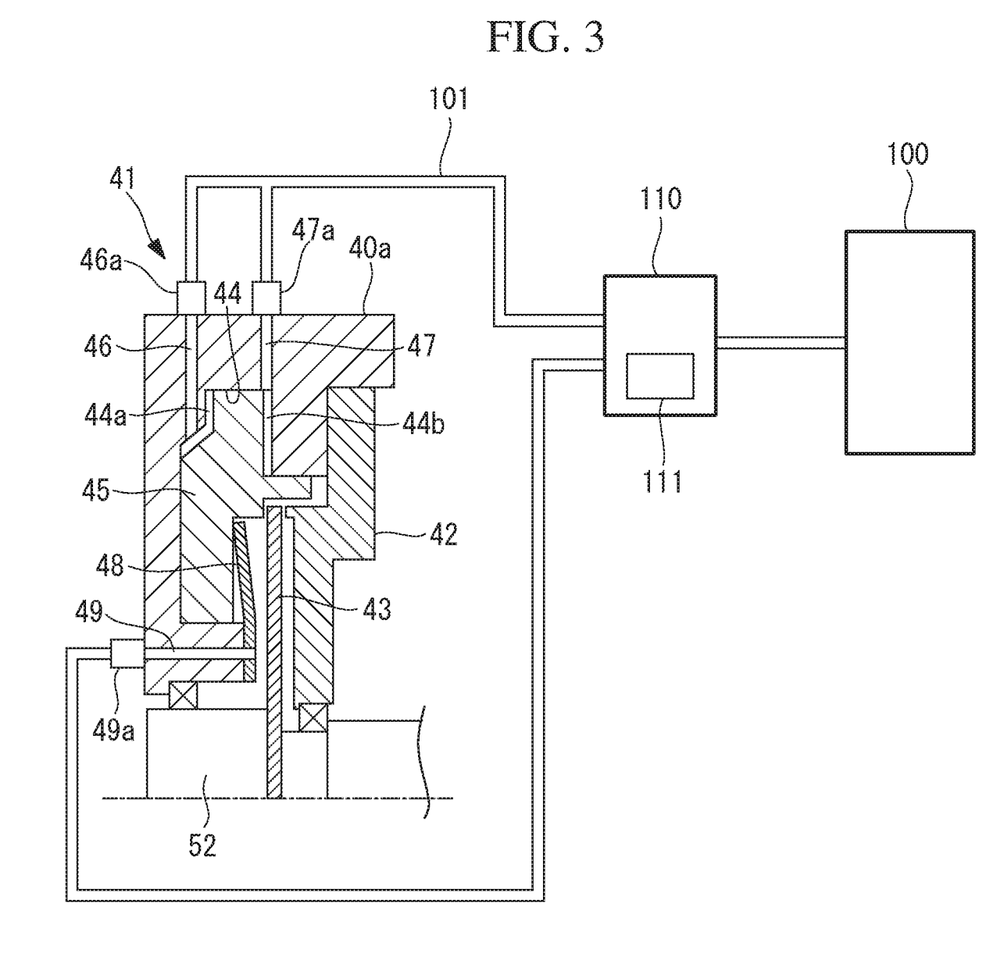
FIG. 3 is a diagram that illustrates an internal structure of a second support section of this embodiment.

FIG. 3 illustrates the structure of the brake 41. The brake 41 of this embodiment has a clamping member 42 fixed to the housing 40a of the second support section 40, a brake disc 43 fixed to the shaft 52, a piston chamber 44 provided in the housing 40a, and a piston 45 arranged inside the piston chamber 44 and movable in an axial direction of the shaft 52.

The piston chamber 44 has a clamping chamber 44a formed at the side of the piston 45 away from the brake disc 43, and an unclamping chamber 44b formed at the side of the piston 45 close to the brake disc 43.

The brake 41 has a fluid passage 46 which has one end connected to the clamping chamber 44a and the other end opened to the outside of the housing 40a, and a valve 46a such as a solenoid valve mounted to the other end of the fluid passage 46. Also, the brake 41 has a fluid passage 47 which has one end connected to the unclamping chamber 44b and the other end opened to the outside of the housing 40a, and a valve 47a such as a solenoid valve mounted to the other end of the fluid passage 47.

Also, the brake 41 has a metal spring 48 such as a disc spring that biases the piston 45 in the aforementioned axial direction and in the direction away from the brake disc 43 and the clamping member 42.

As illustrated in FIG. 3, the valve 46*a* and the valve 47*a* are connected via a regulator 110 to the compressor 100 which is a fluid supply source. When the air (fluid) from the compressor 100 is supplied via the pipe 101 and the fluid passage 46 to the clamping chamber 44*a*, the piston 45 is moved against the spring 48 toward the side of the brake disc 43. As a result, the outer circumferential portion of the brake disc 43 is held by and sandwiched between the piston 45 and the clamping member 42 and the shaft 52 is clamped by the frictional force.

Meanwhile, when the air from the compressor 100 is supplied via the pipe 101 and the fluid passage 47 to the unclamping chamber 44*b*, then the piston 45 moves in a direction away from the brake disc 43. As a result, the shaft 52 is placed in an unclamped state.

Also, an air supply hole 49 is provided in the housing 40*a*, and one end of the air supply hole 49 is opened to the space at the outer side in the radial direction of the shaft 52, and the space is located inside the housing 40*a*. Also, the other end of the air supply hole 49 is opened at one end of the housing 40*a*, and valve 49*a* such as a solenoid valve is mounted to the other end thereof. The valve 49*a* is connected via the regulator 110 to the compressor 100. When the valve 49*a* is opened, the air from the compressor 100 is supplied to the inside of the housing 40*a* and the air leaks via a gap of the housing 40*a*. The valve 49*a* is controlled by a controller 60 which will be described later. The leaking air prevents cutting oil, cutting waste, etc. from entering the inside of the housing 40*a*. Air for prevention of intrusion of cutting oil, cutting waste, etc. is also supplied to other portions of the first support section 30, the spindle unit 4, etc.

It should be noted that the regulator 110 adjusts the pressure of the air from the compressor 100 so that it is a pressure suitable for use in the machine tool 1. The regulator 110 has a well-known pressure switch 111. If the pressure of the air from the compressor 100 is equal to or larger than a predetermined set value, then the pressure switch 111 periodically or continuously transmits a pressure satisfaction signal indicating that it is equal to or larger than the set value to the controller 60 which will be described later. If the pressure of the air from the compressor 100 is lower than the predetermined set value, then the pressure switch 111 periodically or continuously transmits a pressure insufficiency signal indicating that it is lower than the set value to the controller 60.

It should be noted that the spring 48 may be configured to bias the piston 45 toward the side of the brake disc 43. In this case, the spring 48 may be arranged on the side of the piston 45 away from the brake disc 43. If this feature is used, the piston 45 is pressed against the brake disc 43 by the spring 48 as long as the air is not supplied to the unclamping chamber 44*b*, and the shaft 52 is placed in a clamped state.

The jig J for fixation of the workpiece is fixed to the second rotary table 54, and the workpiece W is fixed to the jig J. The workpiece W may be directly fixed to the second rotary table 54.

It should be noted that the additional table unit AU can be removed from the X-Y table 22 as needed. The removal and attachment in some cases may be performed by a user of the machine tool 1.

In a case where the additional table unit AU is attached to the X-Y table 22 and the jig J or the workpiece W is fixed to the second rotary table 54 of the additional table unit AU, the machine tool 1 can rotate the workpiece W not only in the X-axis direction and the Y-axis direction but also about the X-axis and about an axis extending in the up-and-down direction. This feature enables sophisticated and accurate machining to be performed on the workpiece W.

The spindle motor 5*a*, the Z-axis motor 3*b*, the Y-axis motor 13, the X-axis motor 23, the first additional shaft motor 31, and the second additional shaft motor 32 are servo motors such as synchronous motors. Note that these motors may be servo motors other than synchronous motors.

The spindle motor 5*a*, the Z-axis motor 3*b*, the Y-axis motor 13, the X-axis motor 23, the first additional shaft motor 31, and the second additional shaft motor 32 each have an operation position detection device such as an encoder, and the results of detection by the operation position detection devices are transmitted to the controller 60 of the machine tool 1.

The spindle motor 5*a*, the Z-axis motor 3*b*, the Y-axis motor 13, the X-axis motor 23, the first additional shaft motor 31, and the second additional shaft motor 32 are connected to the controller 60 of the machine tool 1, and the controller 60 controls these motors 5*a*, 3*b*, 13, 23, 31, and 32.

Figure 4:
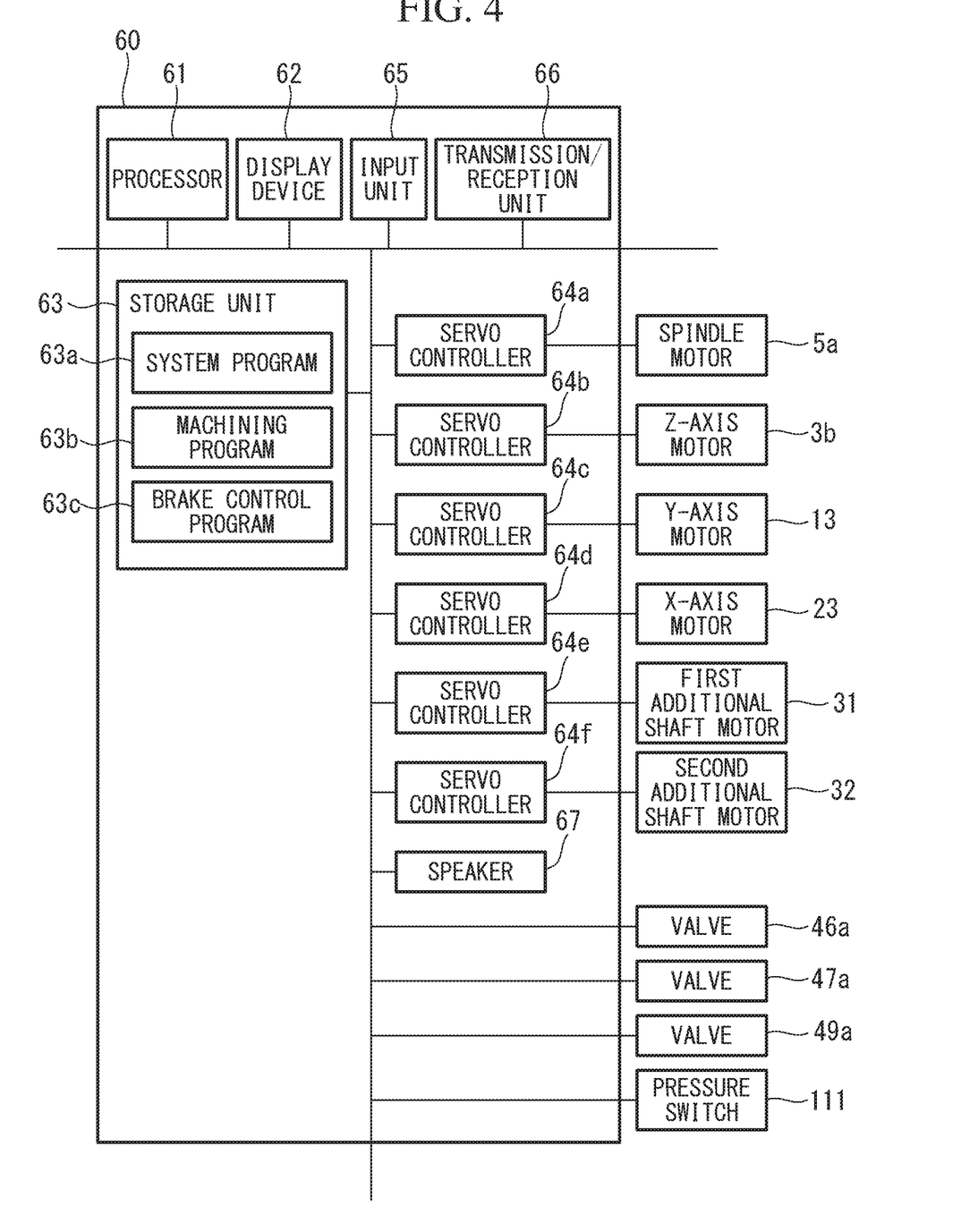
FIG. 4 is a block diagram of a controller of the machine tool of this embodiment.

The controller 60 includes, as illustrated in FIG. 4, a processor 61 that has a CPU and the like, a display device 62 such as a liquid crystal display device, a storage unit 63 that has non-volatile storage, ROM, RAM, etc.; servo controllers 64*a*, 64*b*, 64*c*, 64*d*, 64*e*, and 64*f* which correspond to the spindle motor 5*a*, the Z-axis motor 3*b*, the Y-axis motor 13, the X-axis motor 23, the first additional shaft motor 31, and the second additional shaft motor 32, respectively; an input unit 65 such as an operation panel; a transmission and reception unit 66, and speaker 67. In a case where the display device 62 has a touch screen function, the display device 62 also functions as the input unit.

The input unit 65 may be a portable operation panel, a tablet computer, etc. In the cases of them, all or part of the display device 62 will be provided in the input unit 65. The display device 62 may be provided as a separate device different from the controller 60.

A system program 63*a* is stored in the storage unit 63 and the system program 63*a* is responsible for the basic functionality of the controller 60. Also, a plurality of machining programs 63*b* configured in accordance with the workpiece W and a brake control program 63*c* are stored in the storage unit 63. The brake control program 63*c* may be a program or a set of commands included in the machining program 63*b*.

The controller 60 transmits control commands, control signals, and the like to the servo controllers 64*a*, 64*b*, 64*c*, 64*d*, 64*e*, and 64*f* in accordance with the set of commands of the machining program 63*b*. Also, the controller 60 transmits control commands, control signals, and the like to the valves on the basis of the brake control program 63*c* at a predetermined time point for the machining program 63*b*. As a result of this, the controller 60, while placing the shaft 52 in a clamped or unclamped state at a predetermined time point, brings the tool T rotated by the spindle motor 5*a* into contact with the workpiece W which moves in the X-axis direction, in the Y-axis direction, about the X-axis, and about the axis extending in the up-and-down direction. As a result, the machining is performed on the workpiece W.

The controller 60 of this embodiment determines whether or not the rotation of the first rotary table 6 by the first additional shaft motor 31 should be performed on the basis of the signal from the pressure switch 111 of the regulator 110. An example of the processing by the controller 60 will be described with reference to the flowchart of FIG. 5 and the chart of FIG. 6.

Figure 5:
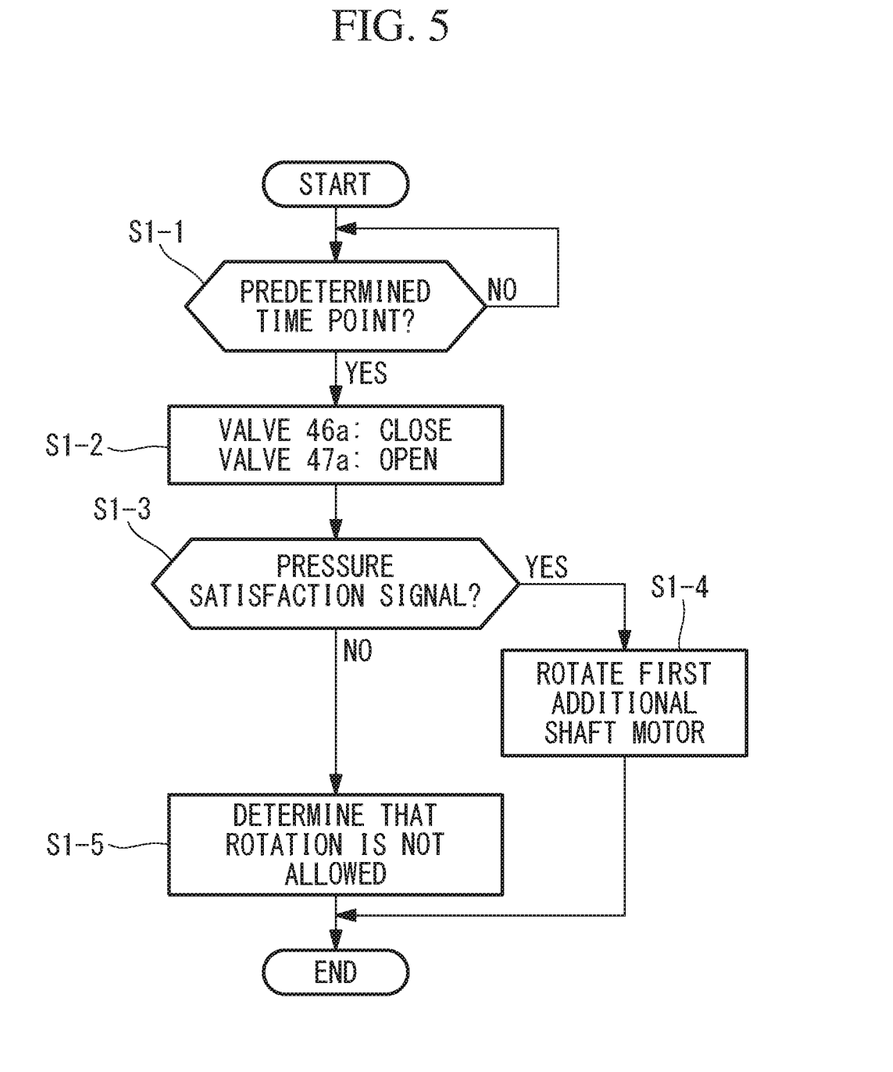
FIG. 5 is a flowchart that illustrates an example of processing by the controller of this embodiment.

Prior to the start of the control, the first rotary table 6 is in a state where it is clamped. When a predetermined time point is reached at which the first rotary table 6 should be rotated (step S1-1), then the controller 60 closes the valve 46a and opens the valve 47a so as to place the first rotary table 6 in an unclamped state on the basis of the brake control program 63c (step S1-2). Also, the controller 60, when receiving from the pressure switch 111 the aforementioned pressure satisfaction signal (step S1-3), rotates the first rotary table 6 until it reaches, for example, a first command position which is the next command position (step S1-4). At this point, the controller 60 transmits control commands, control signals, and the like based on the machining program 63b to the servo controller 64e.

Meanwhile, in the step S1-3, the controller 60, when receiving the aforementioned pressure insufficiency signal from the pressure switch 111, determines that no rotation of the first rotary table 6 should take place (step S1-5).

The controller 60 performs the aforementioned control every time the predetermined time point is reached. For example, as illustrated in FIG. 6, when the aforementioned pressure insufficiency signal is received from the pressure switch 111 at a control commands input time point for rotating the first rotary table 6 so that it reaches the second command position, then the controller 60 performs the above-described determination.

Figure 6:
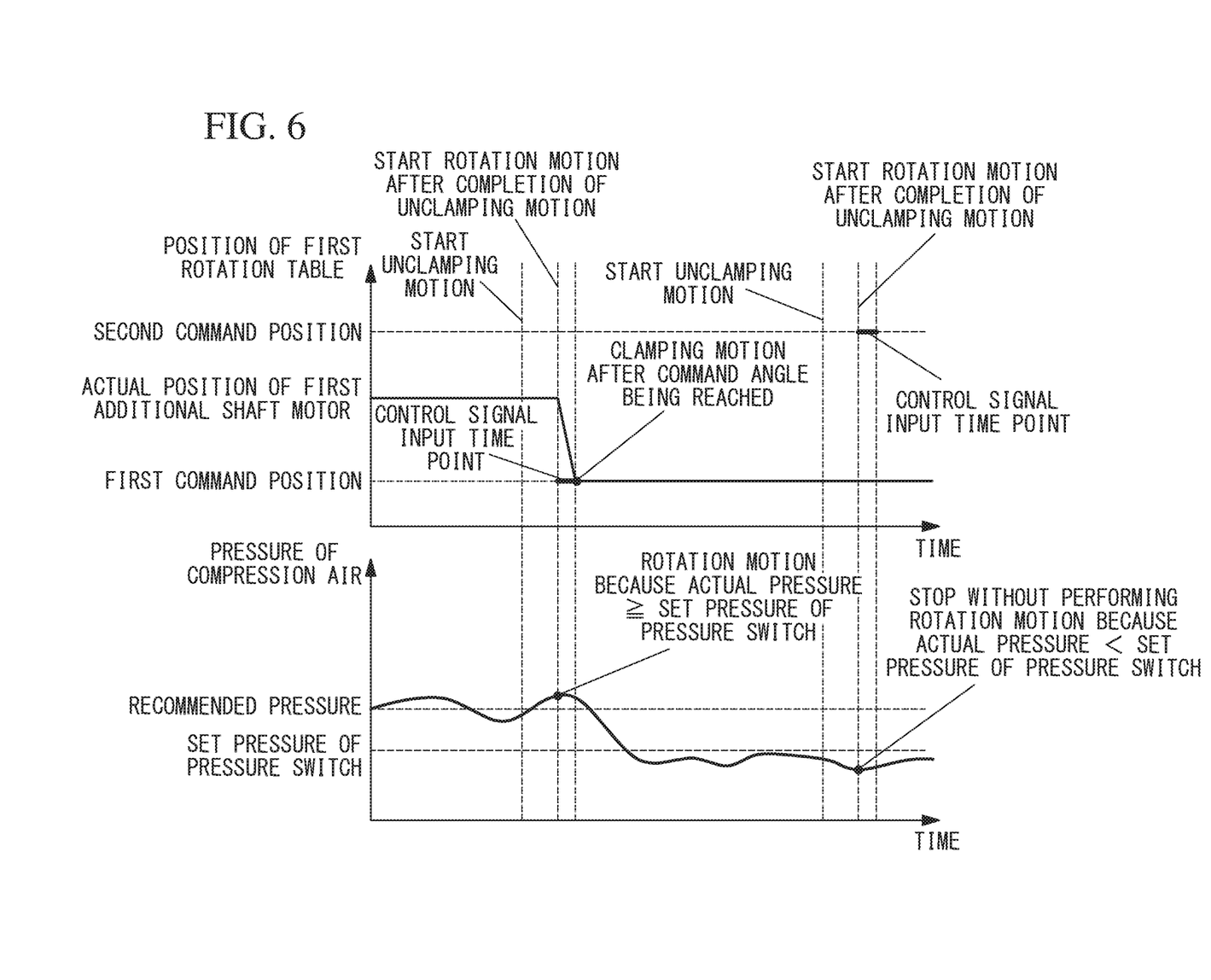
FIG. 6 is a chart that illustrates an example of operation of the machine tool of this embodiment.

In this embodiment, as illustrated in FIG. 6, the set value of the pressure switch 111 is slightly smaller than the recommended pressure of the compressed air used in the brake 41.

A case may occur where the piston 45 is not sufficiently moved away from the brake disc 43 even when the valve 47a is opened in a state where the pressure of the air from the compressor 100 is low. At this point, even in a state where the piston 45 is not away from the brake disc 43, the first additional shaft motor 31 can rotate the brake disc 43 along with the shaft 52. As a result, undesirable wear may occur in the contact portion in the piston 45 with the brake disc 43, the contact portion in the clamping member 42 with the brake disc 43, the brake disc 43, etc. The wear may lead to decrease in the clamping force of the first rotary table 6 by the brake 41, increase in the number of times of maintenance of the brake 41, and the like. Also, the aforementioned situation may lead to failure of the mechanism of the brake 41 at an earlier stage. The clamping force of the brake 41 or the performance of the mechanism significantly affects the quality of the workpiece W to be subjected to the machining by the machine tool 1.

In this embodiment, the controller 60 determines, on the basis of the signal from the pressure switch 111, whether or not the rotation of the first rotary table 6 by the first additional shaft motor 31 should be executed. For example, the controller 60 does not allow rotation of the first additional shaft motor 31 when the pressure of the air from the compressor 100 by the pressure switch 111 is lower than a predetermined set value. This feature is advantageous in prevention of unintentional decrease in the clamping force of the brake 41, maintenance of the performance of the mechanism of the brake 41, prevention of unintentional increase in the number of times of maintenance of the brake 41, and the like. In addition, this feature is also advantageous in improvement or maintenance of the machining accuracy of the workpiece W.

Figure 7:
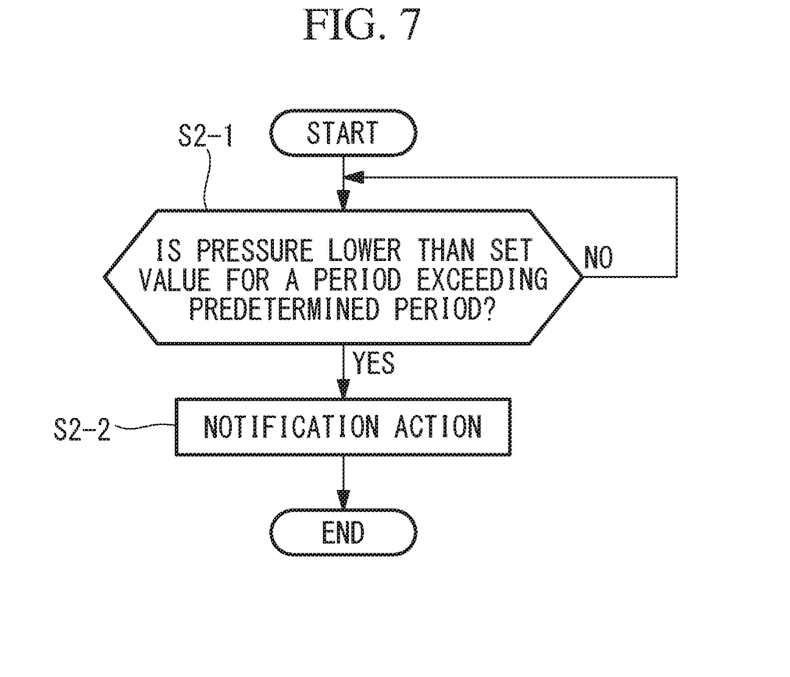
FIG. 7 is a flowchart that illustrates an example of processing by the controller of this embodiment.

It should be noted that, the controller 60 may perform the control illustrated by the flowchart of FIG. 7 along with the control of FIG. 5 or instead of the control of FIG. 5. As illustrated in FIG. 7, the controller 60 determines, on the basis of the pressure satisfaction signal and the pressure insufficiency signal received from the pressure switch 111, whether or not the pressure of the air from the compressor 100 is lower than the aforementioned predetermined set value for a period exceeding a predetermined period (step S2-1). The predetermined period may be several seconds and may be a dozen seconds or more. When "YES" results in the determination at the step S2-1, the controller 60 performs the predetermined notification action (step S2-2).

The predetermined notification action is, for example, control of the display device 62 for displaying a predetermined screen on the display device 62, control of the speaker 67 for emitting a predetermined sound from the speaker 67, and the like.

By virtue of this feature, an operator of the machine tool 1 is allowed to understand that the pressure of the air from the compressor 100 is unstable. This contributes to prevention of unintentional decrease in the clamping force of the brake 41, maintenance of the performance of the mechanism of the brake 41, prevention of unintentional increase in the number of times of maintenance of the brake 41, and the like. Also, this feature is also advantageous for improvement or maintenance of the machining accuracy of the workpiece W.

In the step S2-1, the controller 60 may determine whether or not the pressure insufficiency signal has been received for a predetermined number of times or more during a predetermined period.

Figure 8:
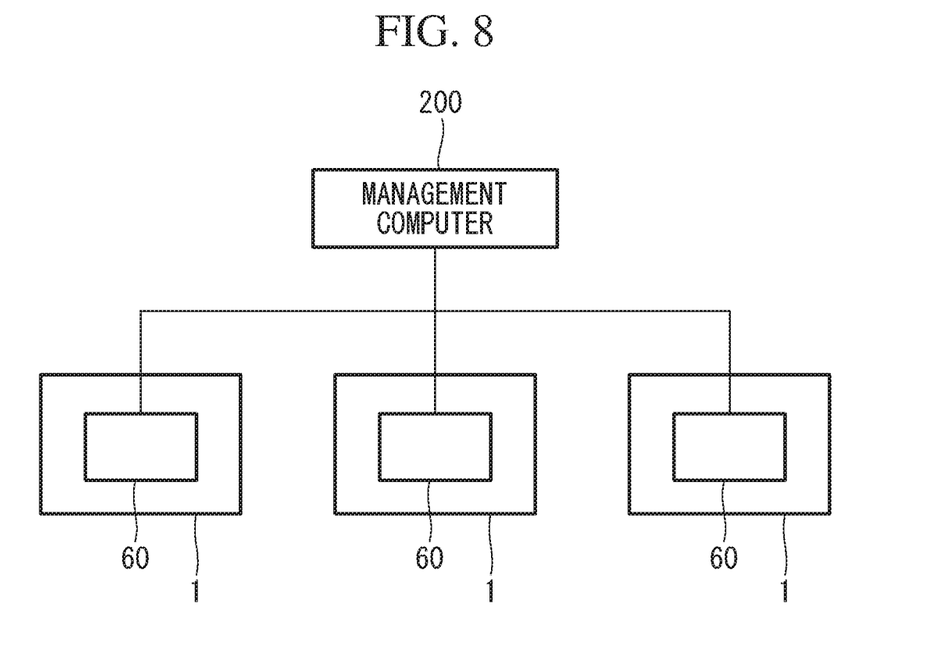
FIG. 8 is a schematic diagram of a machining system that has the machine tool of this embodiment and a management computer.

Also, as illustrated in FIG. 8, multiple machine tools 1 may be connected to management computer 200, by virtue of which the machining system may be configured. The management computer 200 is a well-known computer that includes a processor such as a CPU, a storage unit including RAM, ROM, and non-volatile storage, a display device, an input unit such as a keyboard, touch screen, etc., and a transmission and reception unit.

The management computer 200 receives, from the multiple controllers 60 of the machine tools 1, the individual pieces of the information of a machining status. The information of a machining status is, for example, information or the like regarding the content of the machining program 63b that is being executed, which portion of the machining program 63b is being executed, and the like. Also, the information of a machining status may encompass information of the time point at which the air from the compressor 100 is used, and the applications thereof. For example, from the controller 60 of the machine tool 1, information of the time point at which the valve 46a and the valve 47a for the brake 41 are opened and the information of the time point at which the valve 49a for prevention of intrusion of cutting oil, cutting waste, etc. is opened are received. An example of the information of the time point is information of the times at which the valves 46a, 47a, and 49a are opened and closed.

The controller 60 and the management computer 200 in general include a calendar function, and the times of their calendar functions are in agreement with each other. As a result, the management computer 200 recognizes the time points at which, and the applications for which, the air is used in the individual machine tools 1.

In some cases, air is supplied from one single compressor 100 to dozens, several tens, or several hundreds or more of the machine tools 1. At this point, for example, when the valve 46a and the valve 47a for the brake 41 are opened simultaneously in several tens of the machine tools 1, then the pressure of the air from the compressor 100 is likely to become lower than the aforementioned predetermined set value.

When it has been determined, on the basis of the aforementioned information, that a period exists in which the used amount of the air by the multiple machine tools 1 exceeds the predetermined criterion, then the management computer 200 requests some of the machine tools to change their machining processes. The request indicates that, for example, the time point at which the valve 46a and the valve 47a are opened should be changed for some of the machine tools 1. For this change, the management computer 200 transmits, to some of the machine tools 1, control signals for changing the time point at which the valve 46a and the valve 47a are opened or the time point at which the machining program 63b is executed. This feature effectively prevents the pressure of the air from the compressor 100 from becoming equal to or lower than a predetermined criterion and contributes to improvement of the machining accuracy of the workpiece W.

It should be noted that, if a brake similar to the brake 41 is provided in the second additional shaft motor 32, the controller 60 can determine that no rotation should take place for the second additional shaft motor 32 in the same or similar manner as in the case of the first additional shaft motor 31.

It should be noted that the additional table unit AU may be configured to include only the first additional shaft motor 31 or include only the second additional shaft motor 32. If the additional table unit AU only includes the second additional shaft motor 32, then the additional table unit AU rotates the attached workpiece W and jig J about the axis extending in the up-and-down direction.

REFERENCE SIGNS LIST

1 machine tool
1a machine tool main body
2 base
3 column section
4 spindle unit
4a spindle
4b spindle head
5 table unit (movement mechanism)
5a spindle motor
6 first rotary table
12 Y-direction movable section
13 Y-axis motor
22 X-Y table
22a groove
23 X-axis motor
30 first support section
31 first additional shaft motor
32 second additional shaft motor
40 second support section
41 brake
44 piston chamber
45 piston
46a, 47a valve
51, 52 shaft
53 plate member
54 second rotary table
60 controller
61 processor
62 display device
63 storage unit
63a system program
63b machining program
63c brake control program
100 compressor (fluid supply source)
110 regulator
111 pressure switch
200 management computer
T tool
W workpiece
J jig
AU additional table unit (movement mechanism)

The invention claimed is:

1. A machine tool comprising:
a rotary table to which a workpiece to be subjected to machining is attached;
a motor that rotates the rotary table;
a brake that places the rotary table in a clamping state or an unclamping state;
a valve that controls fluid supplied from a fluid supply source to the brake for placing the brake in the clamping state or the unclamping state; and
a controller that controls the motor and the valve, wherein the controller determines whether or not rotation of the rotary table by the motor should be executed on the basis of a signal from a pressure switch of a regulator provided between the fluid supply source and the valve.

2. The machine tool according to claim 1, wherein the controller performs predetermined notification when the controller determines, on the basis of the signal from the pressure switch, that a pressure of the fluid from the fluid supply source is lower than a set value of the pressure switch for a period exceeding a predetermined period or when the controller determines that a state where the pressure is lower than the set value occurs for a predetermined number of times or more during a predetermined period.

3. A machining system comprising:
a plurality of the machine tools according to claim 1; and
a management computer that controls the machine tools, wherein
the management computer requests, on the basis of information of a machining status received from the machine tools, some of the machine tools to change the machining process timing when it is determined that a period exists in which a used amount of the fluid exceeds a predetermined criterion.

4. An additional table unit mounted to an X-Y table of a machine tool, the additional table unit comprising:
a rotary table to which a workpiece to be subjected to machining is attached;
a motor that rotates the rotary table;
a brake that places the rotary table in a clamping state or an unclamping state;
a valve that controls fluid supplied from a fluid supply source to the brake for placing the brake in the clamping state or the unclamping state; and
a controller that controls the motor and the valve, wherein the controller determines whether or not rotation of the rotary table by the motor should be executed on the basis of a signal from a pressure switch of a regulator provided between the fluid supply source and the valve.

* * * * *